United States Patent
Ha

(10) Patent No.: US 10,341,365 B1
(45) Date of Patent: Jul. 2, 2019

(54) METHODS AND SYSTEM FOR HIDING TRANSITION EVENTS FOR MALWARE DETECTION

(71) Applicant: FireEye, Inc., Milpitas, CA (US)

(72) Inventor: Phung-Te Ha, Dublin, CA (US)

(73) Assignee: FireEye, Inc., Milpitas, CA (US)

( * ) Notice: Subject to any disclaimer, the term of this patent is extended or adjusted under 35 U.S.C. 154(b) by 346 days.

(21) Appl. No.: 15/199,812

(22) Filed: Jun. 30, 2016

Related U.S. Application Data

(60) Provisional application No. 62/273,392, filed on Dec. 30, 2015.

(51) Int. Cl.
*H04L 29/06* (2006.01)
*G06F 9/455* (2018.01)

(52) U.S. Cl.
CPC ...... *H04L 63/1416* (2013.01); *G06F 9/45558* (2013.01); *H04L 63/1425* (2013.01); *G06F 2009/45595* (2013.01)

(58) Field of Classification Search
None
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 5,983,348 A | 11/1999 | Ji |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Morales, Jose A., et al., ""Analyzing and exploiting network behaviors of malware."", Security and Privacy in Communication Networks. Springer Berlin Heidelberg, 2010. 20-34.

(Continued)

*Primary Examiner* — Farid Homayounmehr
*Assistant Examiner* — Olanrewaju J. Bucknor
(74) *Attorney, Agent, or Firm* — Rutan & Tucker, LLP

(57) ABSTRACT

A method for hiding transition events during malware detection comprising processing of an object within a VM, intercepting an attempted execution of an instruction located on a page in memory associated with the VM, responsive to determining the page includes instructions corresponding to one of a predefined set of function calls, (i) inserting a first transition event into the memory at a location on the page of a first instruction of the instructions, and (ii) setting a permission of the page to be execute only, and responsive to further processing within the VM causing an attempt to read from or write to the page including the first transition event, (i) halting processing within the VM, (ii) removing the first transition event, (iii) setting the permission of the page to prohibit execution, and (iv) resuming the processing is shown.

25 Claims, 6 Drawing Sheets

(56) References Cited

U.S. PATENT DOCUMENTS

| | | |
|---|---|---|
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |

(56) References Cited

U.S. PATENT DOCUMENTS

| | | |
|---|---|---|
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,282,109 B1 | 3/2016 | Aziz et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,798,873 B2 * | 10/2017 | Glew ..................... G06F 21/52 |
| 9,904,780 B2 * | 2/2018 | Rhee ..................... G06F 21/52 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 * | 1/2004 | Szor ..................... G06F 21/566 726/24 |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0198421 A1 * | 9/2005 | Nalawadi ............... G06F 9/4411 710/260 |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010440 A1 * | 1/2006 | Anderson ........... G06F 9/45533 718/1 |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |

(56) References Cited

U.S. PATENT DOCUMENTS

| | | |
|---|---|---|
| 2006/0191010 A1 | 8/2006 | Benjamin |
| 2006/0200863 A1* | 9/2006 | Ray .................... G06F 12/145 726/24 |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0126742 A1* | 5/2008 | Shupak ............... G06F 12/1408 711/217 |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |

(56) References Cited

U.S. PATENT DOCUMENTS

| | | |
|---|---|---|
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0132690 A1* | 5/2013 | Epstein ............... G06F 12/1416 711/159 |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0096247 A1* | 4/2014 | Fischer ................ G06F 21/52 726/23 |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0067763 A1* | 3/2015 | Dalcher ............... G06F 21/554 726/1 |
| 2015/0095590 A1* | 4/2015 | Lu ........................ G06F 12/10 711/146 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0220735 A1 | 8/2015 | Paithane et al. |
| 2015/0372980 A1 | 12/2015 | Eyada |
| 2016/0021142 A1* | 1/2016 | Gafni ................. H04L 63/1425 726/23 |
| 2016/0044000 A1 | 2/2016 | Cunningham |
| 2016/0127393 A1 | 5/2016 | Aziz et al. |
| 2016/0180079 A1* | 6/2016 | Sahita ................. G06F 21/554 726/22 |
| 2017/0091454 A1* | 3/2017 | Sukhomlinov ......... G06F 21/52 |
| 2017/0116418 A1* | 4/2017 | Shanmugavelayutham ................ G06F 21/566 |
| 2017/0116419 A1* | 4/2017 | Woodward ............ G06F 21/554 |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

(56) References Cited

OTHER PUBLICATIONS

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Spitzner, Lance , "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul , "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).

Deutsch, P. , "Zlib compressed data format specification version 3.3" RFC 1950, (1996).

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase © CMU, Carnegie Mellon University, 2007.

Hjelmvik, Erik , "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).

(56) References Cited

OTHER PUBLICATIONS

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Krasnyansky, Max, et al., Universal Tunttap driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Vlalware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].

Marchette, David J., "Computer Intrusion Detection and Network Monitoring: A Statistical Viewpoint", ("Marchette"), 2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

\* cited by examiner

| STATE | PAGE | PERMISSION(S) (R/W/X) |
|---|---|---|
| INITIAL | ---<br>int foo (int a) {<br>   int b = x ;<br>   if (a = = b) {<br>--- | R - - |
| | TRAP FIRST ATTEMPT TO EXECUTE ON PAGE AND WRITE BREAKPOINT AT APPROPRIATE INSTRUCTION | |
| TRAPPED AT ATTEMPTED EXECUTE | ---<br>int foo (int a) {<br>  (BP)  int b = x ;<br>   if (a = = b) {<br>--- | - - X |
| | ① WHEN BP HIT, ANALYZE LBRs FOR ROP EXPLOIT<br>② TRAP SUBSEQUENT ATTEMPTS TO READ OR WRITE ON PAGE | |
| TRAPPED AT ATTEMPTED R/W | ---<br>int foo (int a) {<br>   int b = x ;<br>   if (a = = b) {<br>--- | 1) R - -<br>2) - W -<br>3) R W - |

METHODS AND SYSTEM FOR HIDING TRANSITION EVENTS FOR MALWARE DETECTION

CROSS-REFERENCE TO RELATED APPLICATIONS

This application claims the benefit of priority on U.S. Provisional Application No. 62/273,392, filed Dec. 30, 2015, the entire contents of which are incorporated by reference herein.

FIELD

Embodiments of the disclosure relate to the field of cyber security. More specifically, embodiments of the disclosure relate to a system for performing malware detection routines and avoiding detection of the performance of such routines by inserting and removing transition events, and switching the permissions of pages in memory based on attempts by objects under analysis to read, write or execute from those pages.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto network devices, such as vulnerabilities within operating systems for example. While some vulnerabilities continue to be addressed through software patches, prior to the release of such software patches, network devices will continue to be targeted for attack by exploits, namely malicious computer code that attempts to take advantage of a vulnerability in computer software by acquiring sensitive information or adversely influencing or attacking normal operations of the network device or the entire enterprise network.

In particular, an exploitation technique known as return-oriented programming (ROP) has become fairly widespread recently. ROP is an exploitation technique that allows a writer of malware to chain together sequences of instructions through "return" instructions thereby accomplishing one or more tasks via the execution of the chain of sequences of instructions. The ROP technique was developed as a way to circumvent exploit prevention techniques, such as data execution prevention (DEP) techniques, which have been recently implemented in many operating systems to thwart unauthorized activities including malicious attacks.

Using the ROP technique, malware writers attempt to gain control of the stack and subsequently execute sequences of instructions appearing in executable code, such as a dynamically-loaded library (DLL). The sequences of instructions are chained together through the use of "return" instructions following the sequence of instructions. For example, the "return" instruction following a first sequence of instructions (sequence_1) will point to a starting address of a second sequence of instructions (sequence_2).

The ROP technique often violates a well-known programming invariant which states that an instruction immediately preceding the location branched to by a "return" instruction must be a "call" instruction. Therefore, a malware detection system may detect the use of the ROP technique by determining whether the execution of an application violates this invariant.

Currently, malware detection systems running within a virtual machine may attempt to detect the use of the ROP technique by analyzing the Last Branch Records (LBRs) of a CPU while an application under analysis is executing. However, the application may thwart or avoid detection by reading a register of the model-specific registers (MSRs) and thereby detecting that the LBR functionality is turned on. The application may then alter its intended malicious operations to avoid detection. In addition, the application may detect the LBR functionality is turned on and subsequently turn off the LBR functionality.

BRIEF DESCRIPTION OF THE DRAWINGS

Embodiments of the invention are illustrated by way of example and not by way of limitation in the figures of the accompanying drawings, in which like references indicate similar elements and in which:

FIG. 5 is a block diagram illustrating an exemplary method for implementing a breakpoint mechanism of the return-oriented programming exploit detection method from within a hypervisor of the return-oriented programming exploit detection system of FIG. 1.

DETAILED DESCRIPTION

Figure 1:
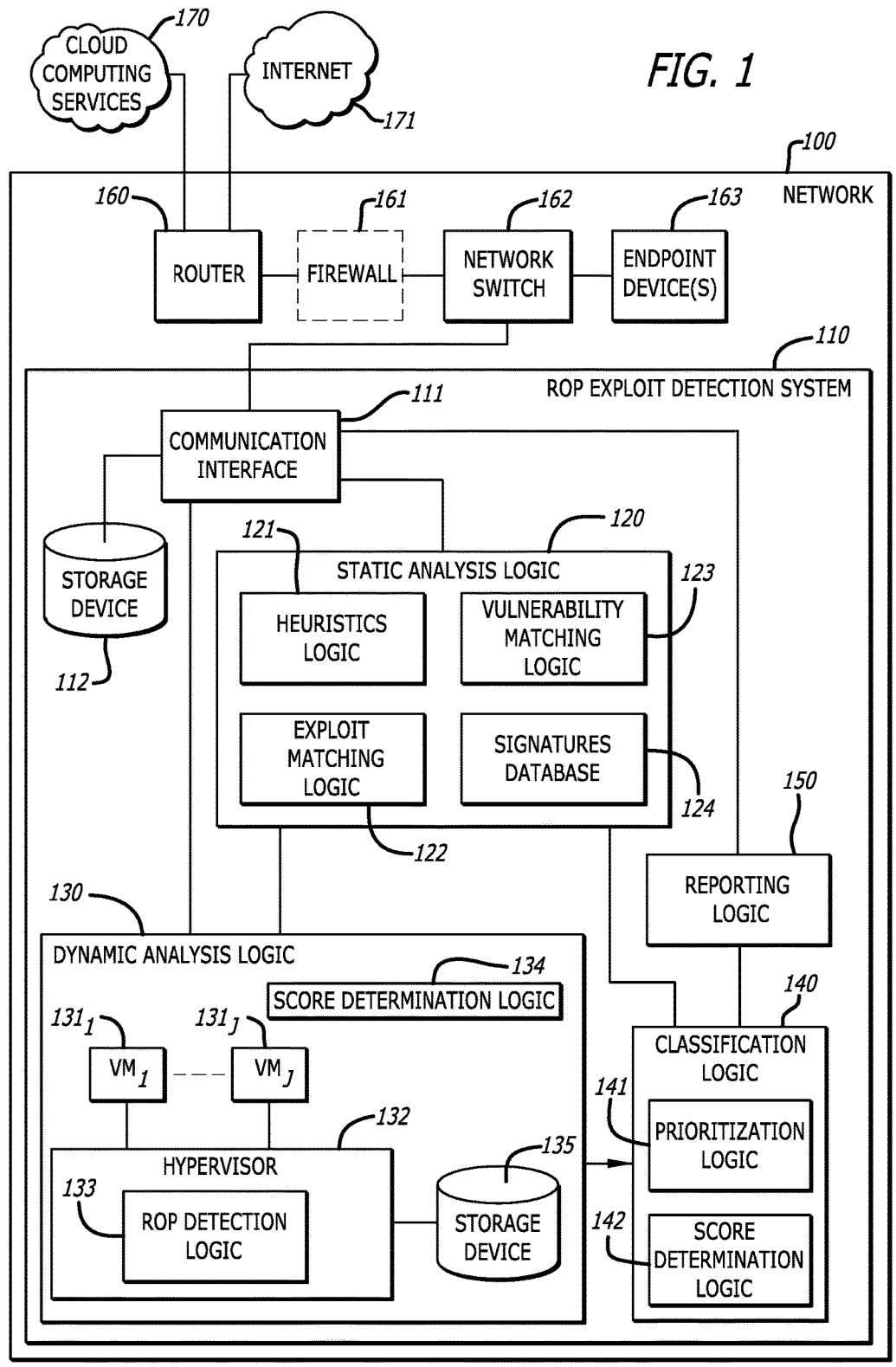
FIG. 1 is an exemplary block diagram of a return-oriented programming exploit detection system 110 deployed with the network 100.

Various embodiments of the disclosure relate to a return-oriented programming (ROP) exploit detection system that improves detection of ROP attacks by performing an analysis from within a hypervisor monitoring one or more virtual machines (VMs). As discussed above, a ROP exploit includes sequences of instructions (known as "gadgets") chained together through "return" instructions thereby accomplishing one or more tasks via the execution of the chain of gadgets.

In one embodiment of the disclosure, a portion of received network traffic is analyzed within one or more virtual machines of a ROP exploit detection system. The VM is managed by a hypervisor (also referred to as virtual machine monitor (VMM)) which resides between the VM and the hardware on which the VM is processed. Therefore, the hypervisor is able to intercept any function calls (e.g., application programming interface (API) function calls) made by an application executing in the VM and any transmissions sent from the hardware to the application. A detection component of the ROP exploit detection system, which resides in the hypervisor of the ROP exploit detection system, may instruct the managing and monitoring performed by the hypervisor. Specifically, the detection component may order the hypervisor to alter permissions on particular pages in memory associated with the application under analysis, and insert and/or remove breakpoints on functions of interest (e.g., a function included within a predefined set of functions that are known to be used with ROP attacks). Herein, a breakpoint may be one example of a transition event that may disrupt the flow of processing (e.g., cause the processing to be halted), and in some embodiments, pass control of the processing to a hypervisor. Examples of other transition events may include, but are not limited or restricted to, breakpoints, function calls, system calls, or alternative, specified instructions (the term "breakpoint" will be used herein, but the disclosure should not be limited). In one embodiment, the predefined set of functions may be a predefined set of API functions. In a second embodiment, the predefined set of functions may be one or more API functions and one or more instructions not associated with an API function. In yet another embodiment, a breakpoint may be placed on every instruction.

Responsive to the execution of the application under analysis hitting a breakpoint, the detection component may analyze the contents of the Last Branch Record (LBR) to determine whether previous branches adhere to the invariant discussed above. The detection component may inspect one or more MSR pairs of the LBR, specifically a FROM MSR, to determine whether this FROM MSR contains a memory address that points to a "return" instruction. When the location in the FROM MSR contains a "return" instruction, the detection component inspects the instruction immediately preceding the location branched to by the "return" instruction by inspecting the respective TO MSR. When the instruction immediately preceding the location branched to by the "return" instruction is not a "call" instruction, the detection component determines the execution of the application under analysis is exhibiting characteristics of ROP. When the instruction immediately preceding the location branched to by the "return" instruction is not a "call" instruction, the execution of the application has violated the invariant discussed above. Herein, a "call" instruction may be an instruction within 32-bit x86 assembly language programming, for example, that pushes a current code location onto a stack in memory and performs an unconditional jump instruction. A call instruction may also save the location to which to return when the call instruction is complete. Therefore, the detection component can conclude that the application under analysis is likely associated with a ROP attack.

Additionally, once a breakpoint is added to memory, the permissions of the page in memory at which the instruction on which the breakpoint was placed are set to "execute only." When the execution of the application attempts the read from, or write to, a page in memory having its permissions set to "execute only," the detection component instructs the hypervisor to remove the breakpoint(s) and set the permissions of the page to be "read and write only."

The above-described overview includes numerous advantages over the current technology. For example, by managing the breakpoint mechanism from within the hypervisor and in conjunction with the operation of the ROP detection logic, also within the hypervisor, the breakpoint mechanism is removed from the VM in which the process is executing; thus, the hypervisor may prevent the process from detecting that a breakpoint has been placed on an instruction (i.e., preventing the process from detecting its execution is being monitored). Additionally, as the hypervisor sets the permissions of the page on which a breakpoint is placed to "execute only," the hypervisor intercepts all attempts to read from and/or write to the page. This prevents the process from removing the breakpoint as well as detecting the breakpoint. In contrast, in current technology that includes exploit detection running within the VM executing the process, the executing process (or other processes executing) may detect the breakpoint and/or remove or alter the breakpoint.

Additionally, the hypervisor intercepts any attempts to read from or write to the MSRs which prevents the executing process (or other processes) from detecting the LBR functionality is enabled. Additionally, the hypervisor may prevent the disabling of the LBR functionality by an executing process. The hypervisor may intercept an attempt to read a control register of the MSRs (which would allow the process to determine whether the LBR functionality is enabled), and provide the process with a desired response (e.g., the hypervisor may provide the process with a response stating the LBR functionality is disabled, when the LBR functionality is actually enabled). Therefore, the executing process will not adjust its processing (which may include potentially suspicious, malicious and/or unwanted behaviors), allowing the ROP detection logic to determine whether the processing displays characteristics of ROP. In contrast, executing processes in current exploit detection technology implemented within the VM in which the process is executing may be able to read from and/or write to a control register of the MSRs, thereby detecting the LBR functionality is enabled and adjust its processing, and/or disable the LBR functionality.

I. Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software to cause a network device or other portions of a network to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context.

The term "processing" may include execution of a binary or launching an application wherein launching should be interpreted as placing the application in an open state and, in some implementations, performing simulations of actions typical of human interactions with the application. For example, the application, an Internet browsing application, may be processed such that the application is opened and actions such as visiting a website, scrolling the website page, and activating a link from the website are performed (e.g., the performance of simulated human interactions).

The term "object" generally refers to a collection of data, whether in transit (e.g., over a network) or at rest (e.g., stored), often having a logical structure or organization that enables it to be categorized or typed for purposes of analysis. During analysis, for example, the object may exhibit a set of expected and/or unexpected characteristics and, during processing, a set of expected and/or unexpected behaviors, which may evidence the presence of malware and potentially allow the object to be categorized or typed as malware. In one embodiment, an object may include a binary file that may be executed within a virtual machine. Herein, the terms "binary file" and "binary" will be used interchangeably.

The term "network device" may be construed as any intelligent electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc.

The term "malicious" may represent a probability (or level of confidence) that the object is associated with a malicious attack or known vulnerability. For instance, the probability may be based, at least in part, on (i) pattern matches; (ii) analyzed deviations in messaging practices set forth in applicable communication protocols (e.g., HTTP, TCP, etc.) and/or proprietary document specifications (e.g., Adobe PDF document specification); (iii) analyzed compliance with certain message formats established for the protocol (e.g., out-of-order commands); (iv) analyzed header or payload parameters to determine compliance, (v) attempts to communicate with external servers during processing in one or more VMs, (vi) attempts to access, without the appropriate permissions, memory allocated to the application during processing, and/or (vii) other factors that may evidence unwanted or malicious activity.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detecting exploits associated with ROP attacks. As this invention is susceptible to embodiments of many different forms, it is intended that the present disclosure is to be considered as an example of the principles of the invention and not intended to limit the invention to the specific embodiments shown and described.

II. Network Appliance Deployment

1. Network Appliance Deployment

Referring to FIG. 1, an exemplary block diagram of a return-oriented programming exploit detection system 110 deployed within the network 100 is shown. In one embodiment, the network 100 may be an enterprise network that includes the return-oriented programming (ROP) detection system 110, a router 160, an optional firewall 161, a network switch 162, and one or endpoint devices 163. The network 100 may include a public network such as the Internet, a private network (e.g., a local area network "LAN", wireless LAN, etc.), or a combination thereof. The router 160 serves to receive data, e.g., packets, transmitted via a wireless medium (e.g., a Wireless Local Area Network (WLAN) utilizing the Institute of Electrical and Electronics Engineers (IEEE) 802.11 standard) and/or a wired medium from the cloud computing services 170 and the endpoint devices 163. As is known in the art, the router 160 may provide access to the Internet for devices connected to the network 110.

In one embodiment, the network switch 162 may capture network traffic, make a copy of the network traffic, pass the network traffic to the appropriate endpoint device(s) 163 and pass the copy of the network traffic to the ROP exploit detection system 110. In a second embodiment, the network switch 162 may capture the network traffic and pass the network traffic to the ROP exploit detection system 110 for processing prior to passing the network traffic to the appropriate endpoint device(s) 163. In such an embodiment, the network traffic will only be passed to the appropriate endpoint device(s) 163 if the analysis of the network traffic does not indicate that the network traffic is associated with a malicious attack, anomalous or unwanted behavior, or, in particular, an exploit associated with a ROP attack.

The ROP exploit detection system 110 includes a communication interface 111, a storage device 112, a static analysis logic 120, a dynamic analysis logic 130, a classification logic 140, and a reporting logic 150.

As shown, the ROP exploit detection system 110 is communicatively coupled with the cloud computing services 170, the Internet and one or more endpoint devices 163 via the communication interface 111, which directs at least a portion of the network traffic to the static analysis logic 120 and/or the dynamic analysis 130. The static analysis logic 120 may include one or more software modules that, when executed by one or more processors, performs static scanning on a particular object, namely heuristics, exploit signature checks and/or vulnerability signature checks for example. The static analysis logic 120 and the dynamic analysis logic 130 may be one or more software modules executed by the same processor or different processors, where these different processors may be located within the same processor package (e.g., different processor cores)

and/or located at remote or even geographically remote locations that are communicatively coupled (e.g., by a dedicated communication link) or a network.

More specifically, as shown, static analysis logic 120 may be configured with heuristics logic 121, exploit matching logic 122, and/or vulnerability matching logic 123. Heuristics logic 121 is adapted for analysis of certain portions of an object under analysis (e.g., the object may include a binary file) to determine whether any portion corresponds to either (i) a "suspicious" identifier such as either a particular Uniform Resource Locator "URL" that has previously been determined as being associated with known exploits, a particular source or destination (IP or MAC) address that has previously been determined as being associated with known exploits; or (ii) a particular exploit pattern. When deployed, the exploit matching logic 122 may be adapted to perform exploit signature checks, which may involve a comparison of an object under analysis against one or more pre-stored exploit signatures (e.g., pre-configured and predetermined attack patterns) from signatures database 124. Additionally or in the alternative, the static analysis logic 120 may be configured with vulnerability matching logic 123 that is adapted to perform vulnerability signature checks, namely a process of uncovering deviations in messaging practices set forth in applicable communication protocols (e.g., HTTP, TCP, etc.). The term "signature" designates an indicator of a set of characteristics and/or behaviors exhibited by one or more exploits that may not be unique to those exploit(s). Thus, a match of the signature may indicate to some level of probability, often well less than 100%, that an object constitutes an exploit. In some contexts, those of skill in the art have used the term "signature" as a unique identifier or "fingerprint," for example, of a specific virus or virus family (or other exploit), which is generated for instance as a hash of its machine code, and that is a special sub-case for purposes of this disclosure.

The classification logic 140 may be configured to receive the static-based results (e.g., results from static analysis, metadata associated with the incoming network traffic, etc.) and/or the VM-based results. According to one embodiment of the disclosure, the classification logic 140 comprises prioritization logic 141 and score determination logic 142. The prioritization logic 141 may be configured to apply weighting to results provided from dynamic analysis logic 130 and/or static analysis logic 120. Thereafter, the classification logic 140 may route the classification results comprising the weighting and/or prioritization applied to the static-based results and/or the VM-based results to the reporting logic 150. The classification results may, among others, classify any malware and/or exploits detected into a family of malware and/or exploits, describe the malware and/or exploits and provide the metadata associated with any object(s) within which the malware and/or exploits were detected. The reporting logic 150 may generate an alert for one or more endpoint devices 163 and/or route the alert to a network administrator for further analysis. In addition, the reporting logic 150 may store the classification results (including the static-based results 140 and the VM-based results 150) in the storage device 112 for future reference.

The static analysis logic 120 may route suspicious objects (and, in many cases, even previously classified malicious objects) to the dynamic analysis logic 130. In one embodiment, the dynamic analysis logic 130 is configured to provide, at least, an analysis of a binary included in the received network traffic and/or suspicious object(s) from the static analysis logic 120 by analyzing the content of one or more LBRs associated with the VM processing the binary.

Upon receiving at least a binary file from the communication interface 111 and/or the static analysis logic 120, the dynamic analysis logic 130 performs processing within one or more VMs on the binary, e.g., the binary is executed within the one or more VMs $131_1$-$131_j$ (where $j \geq 1$). The processing may occur within one or more virtual machine instances (VMs), which may be provisioned with a guest image associated with a prescribed software profile. Each guest image may include a software application and/or an operating system (OS). Each guest image may further include one or more monitors, namely software components that are configured to observe and capture run-time behavior of an object under analysis during processing within the virtual machine. During the processing within the virtual machine, the network traffic is analyzed.

As will be discussed in detail below, the binary will begin execution within a virtual machine wherein the permissions of the pages of memory associated with the binary are set to "read only." When the binary attempts to execute an instruction on a page having its permissions set to "read only," the execution is halted, the page is analyzed to determine whether a function of interest (e.g., a function included in a set of predefined functions that are known to likely be associated with ROP attacks), and when the page includes one or more functions of interest, the hypervisor writes a breakpoint at the location in memory of the first instruction of the function. The permissions of the page are set to "execute only," and the execution of the binary resumes. In a first scenario, when a breakpoint is hit, the execution is again halted and the detection component within the hypervisor performs an analysis of the LBRs to determine whether the execution of the binary is exhibiting ROP characteristics. In a second scenario, when the execution of the binary file results in an attempt to read or write to a page having its permissions set to "execute only," (e.g., a page containing a breakpoint), the execution is halted, the breakpoint is removed and the permissions of the page are set to "read and write only." In the second scenario, the removal of the breakpoint is done to prevent the binary from detecting that its execution is being monitored. In some instances, once a binary detects that its execution is being monitored, it may alter its execution so that it no longer attempts to perform anomalous or malicious behaviors or operations in order to avoid detection.

2. Logical Representation

Figure 2:
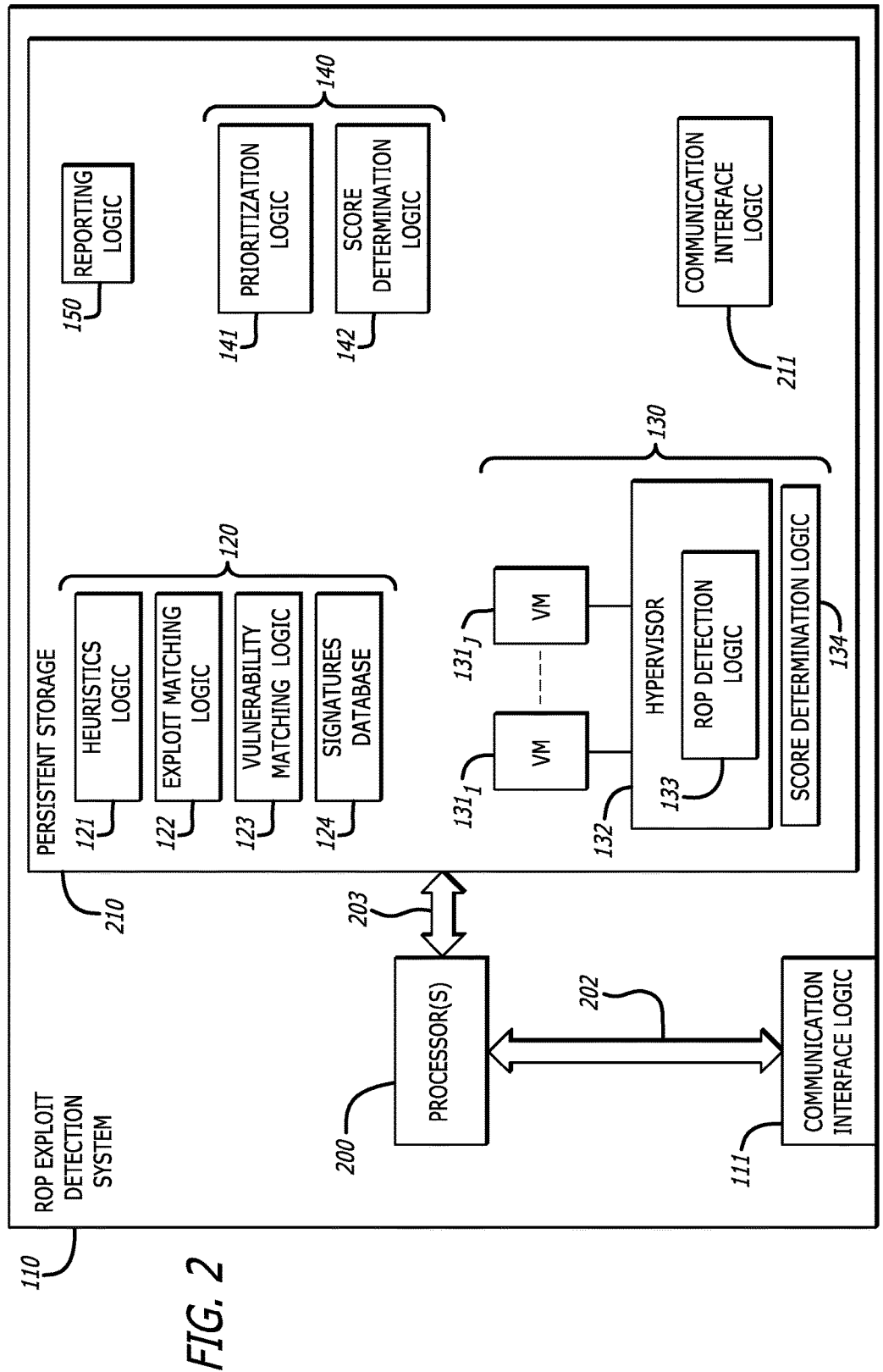
FIG. 2 is an exemplary embodiment of a logical representation of the return-oriented programming exploit detection system of FIG. 1.

FIG. 2 is an exemplary embodiment of a logical representation of the return-oriented programming exploit detection system of FIG. 1. The ROP detection system 110 includes one or more processors 200 that are coupled to communication interface 111 via a first transmission medium 202. The communication interface 111, and the communication interface logic 211 located within a persistent storage 210, enables communication with network devices via the Internet, the cloud computing services and one or more the endpoint devices. According to one embodiment of the disclosure, the communication interface 111 may be implemented as a physical interface including one or more ports for wired connectors. Additionally, or in the alternative, the communication interface logic 111 may be implemented with one or more radio units for supporting wireless communications with other electronic devices.

The processor(s) 200 is further coupled to persistent storage 210 via a second transmission medium 203. According to one embodiment of the disclosure, persistent storage 210 may include (a) the static analysis logic 120 including a heuristics logic 121, an exploit matching logic 122, a vulnerability matching logic 123, and a signatures database 124, (b) a dynamic analysis logic 130 including one or more VMs 131₁-131ⱼ, a hypervisor, also referred to as a virtual machine monitor (VMM), 132, which includes a ROP detection logic 133 (e.g., a detection component), and a score determination logic 134, (c) a classification logic 140 including a prioritization logic 141, and a score determination logic 142, and (d) a reporting logic 150. Of course, when implemented as hardware, one or more of these logic units could be implemented separately from each other.

III. Return-Oriented Programming Detection Methodology

Figure 3:
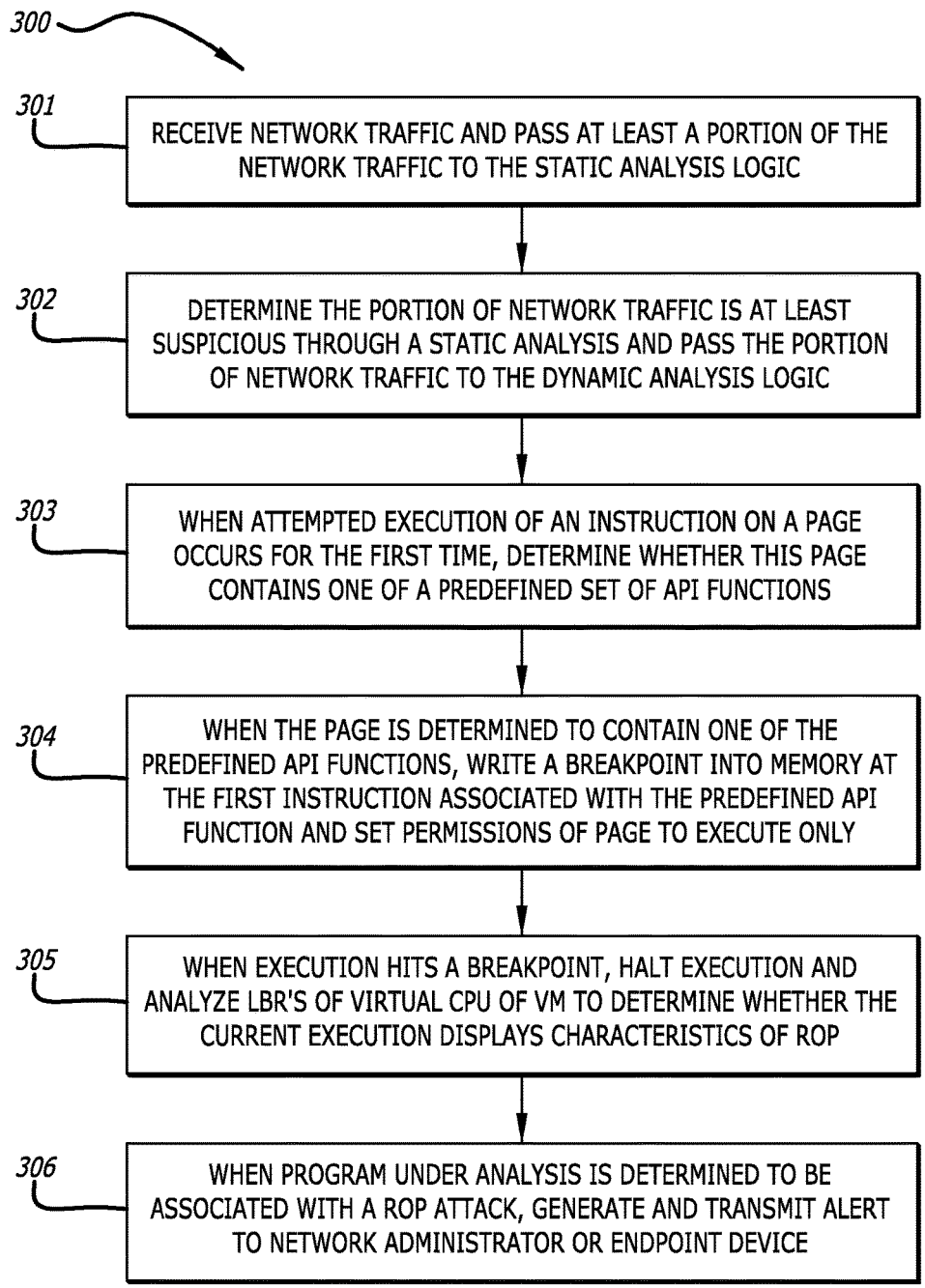
FIG. 3 is a flowchart illustrating an exemplary method for detecting exploits associated with a return-oriented programming attack using Last Branch Records from within a hypervisor of the return-oriented programming exploit detection system of FIG. 1.

FIG. 3 is a flowchart illustrating an exemplary method for detecting exploits associated with a return-oriented programming attack by analyzing Last Branch Records (LBRs) from within a hypervisor of the ROP exploit detection system of FIG. 1. Each block illustrated in FIG. 3 represents an operation performed in the method 300 of detecting exploits associated with a ROP attack using LBRs from within a hypervisor of a ROP exploit detection system. Referring to FIG. 3, the ROP exploit detection system receives network traffic and passes at least a portion of the network traffic to the static analysis logic (block 301).

At block 302, the static analysis logic determines the portion of the network traffic is at least suspicious through performance of a static analysis and passes at least the suspicious portion of the network traffic to the dynamic analysis logic. Upon receiving the portion of the network traffic, one or more VMs within the dynamic analysis logic are provisioned with a guest image and execution of the portion of the network traffic, e.g., a binary file, begins in each of the one or more provisioned VMs. At block 303, when the binary file attempts to execute an instruction on a page in memory associated with the binary file within the VM for the first time, the execution is halted and the detection component of the ROP exploit detection system requests that the hypervisor determine whether the page contains one of a predefined set of application programming interface (API) function.

When the page is determined to contain one or more of the predefined set of functions, the detection component requests that the hypervisor write a breakpoint into memory at the first instruction associated with the predefined function (block 304). Additionally, the detection component requests that the hypervisor sets the permissions of the page to "execute only." At block 305, when the execution of the binary file hits a breakpoint, the hypervisor halts the execution and the detection component within the hypervisor analyzes the LBRs of the CPU of the VM to determine whether the currently execution displays characteristics of ROP.

Finally, when the binary file under analysis is determined to be associated with a ROP attack (e.g., the execution exhibits characteristics of ROP), the ROP exploit detection generates an alert and transmits the alert to a network administrator and/or one or more endpoint devices (block 306).

1. Implementation of Breakpoint Mechanism

Figure 4:
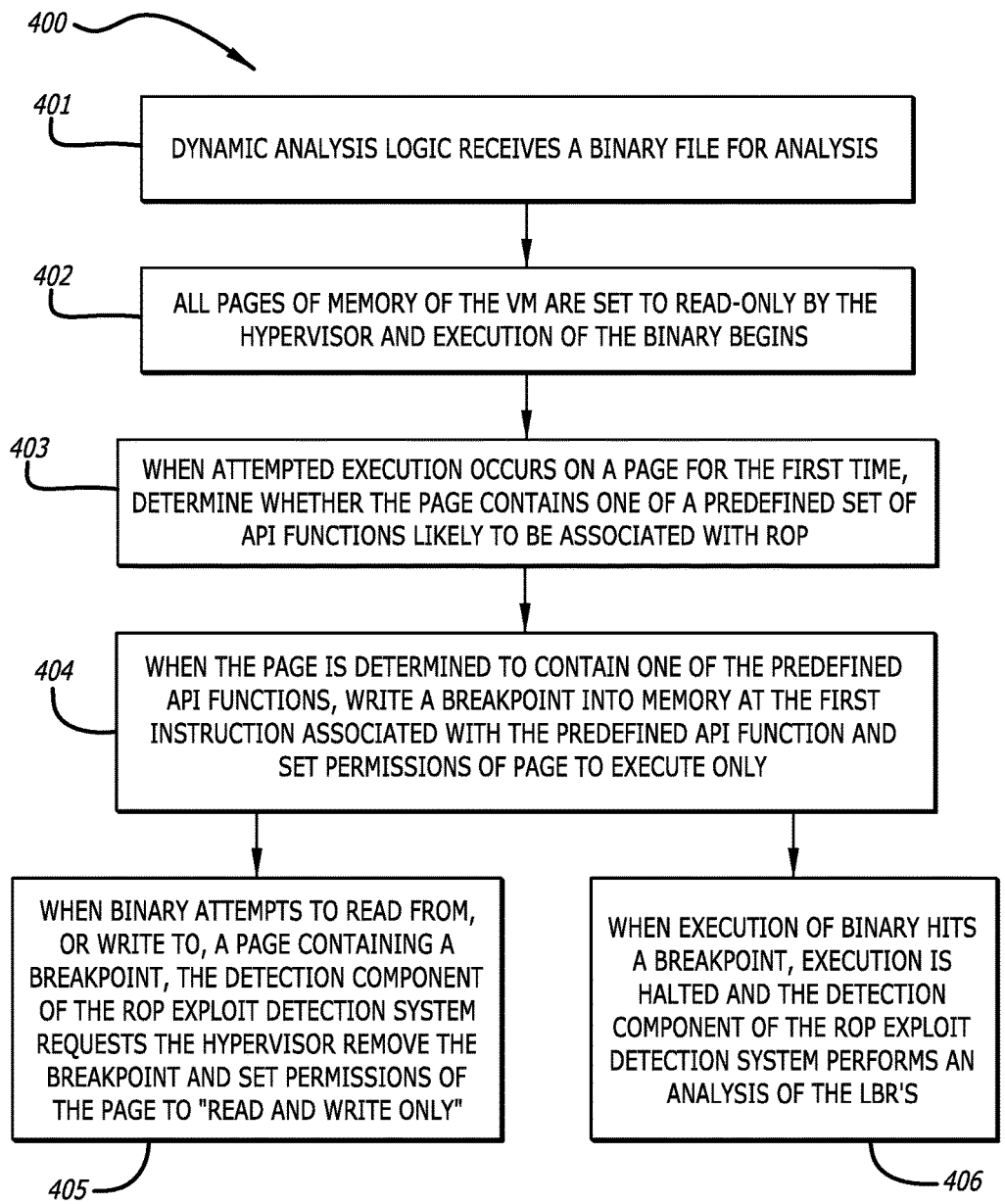
FIG. 4 is a flowchart illustrating an exemplary method for implementing a breakpoint mechanism of the return-oriented programming exploit detection method from within a hypervisor of the return-oriented programming exploit detection system of FIG. 1.

FIG. 4 is a flowchart illustrating an exemplary method for implementing a breakpoint mechanism of the ROP exploit detection method from within a hypervisor of the ROP exploit detection system of FIG. 1. Each block illustrated in FIG. 4 represents an operation performed in the method 400 of implementing the breakpoint mechanism as used within the ROP exploit detection process from within the hypervisor of a ROP exploit detection system. Referring to FIG. 4, the dynamic analysis logic of the ROP exploit detection system receives at least a binary file from within network traffic received by the ROP exploit detection system (block 401). In one embodiment, the portion of the received network traffic that includes the binary file may have been analyzed by the static analysis logic of the ROP exploit detection system and determined to be suspicious or malicious. In a second embodiment, the portion of the received network traffic that includes the binary file may have been passed directly to the dynamic analysis logic from the communication interface (e.g., the processing by the dynamic analysis logic may be performed without the ROP exploit detection system performing a static analysis or the processing by with dynamic analysis logic and the static analysis may be performed concurrently, meaning at least partly overlapping in time).

At block 402, the pages of the memory associated with the VM are set to "read-only" by the hypervisor and execution of the binary file begins. At block 403, when the execution of the binary file attempts to execute an instruction on a page for the first time, the detection component of the ROP exploit detection system requests that the hypervisor determine whether the page contains one of a predefined set of functions likely to be associated with ROP. For example, the predefined set of functions may be compiled as a result of experiential knowledge.

At block 404, when the page is determined to at least contain one of the predefined functions, the detection component requests that the hypervisor (i) write a breakpoint into memory at the first instruction associated with the predefined instruction. Additionally, the hypervisor sets the permissions of the page to "execute only." The execution of the binary file is then resumed within the VM.

When the binary attempts to subsequently read from, or write to, a page containing a breakpoint (e.g., a page that has its permissions set to "execute only" due to the presence of the breakpoint), the detection component requests the hypervisor remove the breakpoint and set the permissions of the page to "read and write only." As was discussed above, by monitoring the execution of the binary file under analysis from the hypervisor, the ROP exploit detection system can prevent the binary file from detecting the execution is being monitored by preventing the binary file from reading that a breakpoint has been written into memory. Thereafter, execution of the binary file continues with the binary file being permitted to read and write to the designated page. However, when the binary file attempts to execute an instruction on a page having its permissions set to "read and write only," the process starts again (e.g., the method 400 returns to block 403).

When the execution of the binary file hits a breakpoint, the execution of the binary file is halted at the instruction on which the breakpoint was placed and the detection component performs an analysis of the contents of one or more LBRs associated with the VM processing the binary file (block 406). The analysis of the contents of the one or more LBRs will be discussed below with respect to FIG. 6.

Referring to FIG. 5, a block diagram illustrating an exemplary process of implementing a breakpoint mechanism of the return-oriented programming exploit detection method from within a hypervisor of the ROP exploit detection system of FIG. 1 is shown. Diagram 500 includes six rows, rows 501-506. Row 501 serves as a header to the diagram and sets forth (i) the left-most column of rows 502, 504 and 506 represents the state of the execution; (ii) the center column of rows 502, 504 and 506 represents the relevant portion of the page under analysis in memory; and (iii) the right-most column 502, 504 and 506 represents the permission(s) of the page under analysis in memory.

Referring to row 502, the execution is in its initial stage, which implies that an attempted execution of the page has not been trapped and no breakpoints have been inserted or removed from the page. The center column of row 502 illustrates an exemplary portion of code of an application that is stored in memory on the page under analysis (FIG. 5 merely shows a sample portion of code and does not limit the disclosure to the code explicitly illustrated). The portion of code illustrated does not include a breakpoint. The right-most column indicates that the permissions of the page under analysis are set to "read only."

Referring to row 503, the ROP exploit detection system will trap the first attempt to execute on the page and write a breakpoint at the appropriate instruction, if applicable. In one embodiment, when an application under analysis is executing in a VM and the application attempts to execute an instruction on the page wherein its permissions are set to "read only," the hypervisor monitoring the execution of the application will halt the execution of the application, without indicating such a halt to the application, and determine whether the page includes an instruction (or function) of interest. As disclosed above, the instruction or function of interest may be one of a predefined set of instructions or functions that are known to likely be associated with ROP attacks. When the hypervisor determines such an instruction or function is present on the page, the hypervisor inserts a breakpoint into the memory at the location of the appropriate instruction (e.g., the instruction of interest or the first instruction of the function) and sets the permissions of the page to be "execute only." Thereafter, the application may continue to execute, and because it cannot read from the page, the application cannot detect that a breakpoint has been set.

Referring to row 504, the page under analysis is currently trapped (e.g., halted) at the attempted execution of an instruction on the page. The center column illustrates that a breakpoint has been inserted at the instruction, "if (a==b)," and the right-most column indicates that the permissions have been set to "execute only."

Referring to row 505, in the first scenario, when a breakpoint is hit, the execution is again halted and the detection component within the hypervisor performs an analysis of one or more LBRs to determine whether the execution of the application is exhibiting ROP characteristics. In the second scenario, when the execution of the application results in an attempt to read or write to the page (e.g., the page now containing a breakpoint), the execution is halted, the breakpoint is removed and the permissions of the page are set to one of (i) "read only"; (ii) "write only"; or (iii) "read and write only."

Referring to row 506, the page under analysis is currently trapped (e.g., halted) at the attempted read from or write to the page. The center column illustrates that the breakpoint previously inserted at the instruction, "if (a==b)," has been removed and the right-most column indicates that the permissions have been set to one of (i) "read only"; (ii) "write only"; or (iii) "read and write only."

In the above embodiment, the adjustment of permissions occurs with the second stage page tables. The ROP exploit detection system utilizes a first set of page tables that translate guest virtual addresses (GVAs) to guest physical addresses (GPAs) and a second set of page tables that translate GPAs to host physical addresses (HPAs). The second set of page tables may be referred to as extended page tables (EPTs) or nested page tables (NPT). Alternatively, the second set of page tables may be referred to as second stage or 2D page tables as well. The ROP exploit detection system manipulates the permissions of the pages discussed herein at the EPT level.

2. Last Branch Record Analysis

Figure 6:
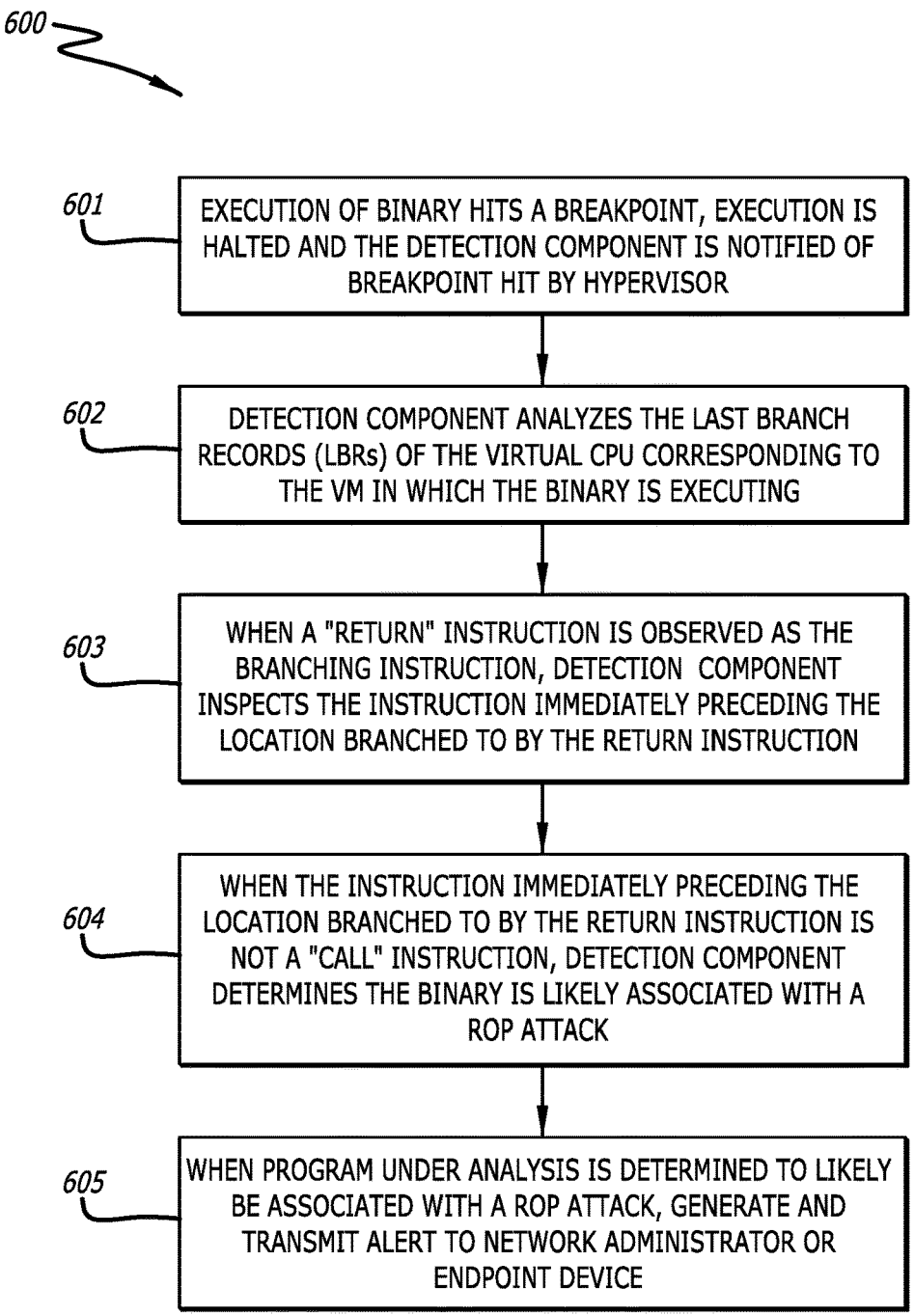
FIG. 6 is a flowchart illustrating an exemplary method for analyzing the Last Branch Records of a CPU of a virtual machine from within a hypervisor of the return-oriented programming exploit detection system of FIG. 1.

Referring to FIG. 6, a flowchart illustrating an exemplary method for analyzing the Last Branch Records of a CPU of a virtual machine from within a hypervisor of the ROP exploit detection system of FIG. 1 is shown. Each block illustrated in FIG. 6 represents an operation performed in the method 600 of analyzing the contents of one or more LBRs of a CPU associated with a VM within which a binary file is being executed. Referring to FIG. 6, prior to block 601, the binary file has been executing within the VM, a breakpoint has been inserted into memory and the permissions of the page in memory in which the breakpoint is located have been set to "execute only." At block 601, the execution of the binary file hits a breakpoint, execution is halted and the detection component is notified of the breakpoint hit by the hypervisor.

Responsive to being notified of the breakpoint hit, the detection component begins an analysis of the LBRs of the CPU corresponding to the VM in which the binary file is executing (block 602). Specifically, the detection component analyzes the branching instructions recorded in the LBRs of the CPU to determine whether a "return" instruction was previously made by the executing binary file.

When a "return" instruction is observed as a branching instruction, the detection component inspects the instruction in memory immediately preceding the location branched to by the "return" instruction (block 603). As discussed above, one invariant of computer software is that a software program not associated with ROP will pair a "call" instruction with a "return" instruction such that a "return" instruction should branch to an instruction immediately preceded by a "call" instruction.

Thus, when the instruction immediately preceding the location branched to by the "return" instruction is not a "call" instruction, the detection component determines the execution of the binary file is exhibiting characteristics of ROP (block 604). In one embodiment, the observation of that the instruction immediately preceding the location branched to by the "return" instruction in not a "call" instruction is provided to a score determination logic within the dynamic analysis logic so that a score indicating a likelihood the binary file is associated with a ROP attack may be determined. In a second embodiment, the dynamic analysis logic may provide a classification logic outside of the dynamic analysis logic the results of the dynamic analysis logic such that the classification logic may perform a prioritization (e.g., a weighting) of the results of the static analysis and the dynamic analysis to determine a score indicating the likelihood that the analyzed portion of received network traffic is associated with a ROP attack. As discussed above, a score above a predefined threshold may indicate that the binary file, or portion of the received network traffic, is malicious and associated with a ROP attack.

When the binary file under analysis (or more generally, the portion of the received network traffic) is determined to likely be associated with a ROP attack, the ROP exploit detection system generates an alert and transmits the alert to a network administrator and/or one or more endpoint devices (block 605). More specifically, the reporting logic of the ROP exploit detection system generates the alert and transmits the alert via the communication interface of the ROP exploit detection system.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory storage medium having stored thereon logic, the logic being executable by one or more processors to perform operations including:
   processing of an object within a virtual machine;
   intercepting an attempted execution of an instruction by the object, the instruction located on a page in memory associated with the virtual machine;
   responsive to determining the page includes instructions corresponding to one of a set of function calls, (i) inserting a first transition event into the memory associated with the virtual machine at a location of a first instruction of the instructions corresponding to a function call of the set of function calls wherein the location is on the page in the memory, and (ii) setting a permission of the page to be execute only; and
   responsive to further processing within the virtual machine causing an attempt to read from or write to the page including the first transition event, (i) halting at least a portion of the processing within the virtual machine, (ii) performing an analysis of at least one last branch record (LBR) of a virtual central processing unit (CPU) of the virtual machine, and (iii) based on the analysis of the at least one LBR, determining whether the processing displays characteristics of a return-oriented programming (ROP) attack.

2. The storage medium of claim 1, wherein the transition event includes one of a function call, system call, or specified instructions, the execution of which results in halting of the processing within the virtual machine.

3. The storage medium of claim 1, wherein the processing of the object within the virtual machine is managed by a virtual machine monitor.

4. The storage medium of claim 3, wherein inserting and removing of the first transition event is performed by the virtual machine monitor.

5. The storage medium of claim 3, wherein setting of the permission is performed by the virtual machine monitor.

6. The storage medium of claim 1, wherein the instructions being executable by the one or more processors to perform operations further including:
   receiving the object within network traffic;
   performing a static analysis on the object; and
   responsive to determining the object is at least suspicious, providing the object to the virtual machine for processing.

7. The storage medium of claim 1, wherein a permission of each page in memory associated with the virtual machine is set to prohibit execution when the processing of the object begins.

8. The storage medium of claim 1, wherein the processing of the object within the virtual machine is part of a malware detection analysis and the setting of the permission of the page to be execute only prevents malware from detecting the malware detection analysis is being conducted.

9. An electronic device comprising:
   one or more processors;
   a storage device including a non-transitory computer-readable medium for storing logic, the logic being executable by the one or more processors to perform operations including:
      processing of an object within a virtual machine;
      intercepting an attempted execution of an instruction by the object, the instruction located on a page in memory associated with the virtual machine;
      responsive to determining the page includes instructions corresponding to one of a set of function calls, (i) inserting a first transition event into the memory associated with the virtual machine at a location of a first instruction of the instructions corresponding to a function call of the set of function calls, wherein the location is on the page in the memory, and (ii) setting a permission of the page to be execute only; and
      responsive to further processing within the virtual machine causing an attempt to read from or write to the page including the first transition event, (i) halting at least a portion of the processing within the virtual machine, (ii) performing an analysis of at least one last branch record (LBR) of a virtual central processing unit (CPU) of the virtual machine, and (iii) based on the analysis of the at least one LBR, determining whether the processing displays characteristics of a return-oriented programming (ROP) attack.

10. The electronic device of claim 9, wherein the transition event includes one of a function call, system call, or specified instructions, the execution of which results in halting of the processing within the virtual machine.

11. The electronic device of claim 9, wherein the processing of the object within the virtual machine is managed by a virtual machine monitor.

12. The electronic device of claim 11, wherein inserting and removing of the first transition event is performed by the virtual machine monitor.

13. The electronic device of claim 11, wherein setting of the permission is performed by the virtual machine monitor.

14. The electronic device of claim 9, wherein the logic being executable by the one or more processors to perform operations further including:
   receiving the object within network traffic;
   performing a static analysis on the object; and
   responsive to determining the object is at least suspicious, providing the object to the virtual machine for processing.

15. The electronic device of claim 9, wherein a permission of each page in memory associated with the virtual machine is set to prohibit execution when the processing of the object begins.

16. The electronic device of claim 9, wherein the processing of the object within the virtual machine is part of a malware detection analysis and the setting of the permission of the page to be execute only prevents malware from detecting the malware detection analysis is being conducted.

17. A method for hiding transition events during malware detection comprising:
   processing of an object within a virtual machine;
   intercepting an attempted execution of an instruction by the object, the instruction located on a page in memory associated with the virtual machine;
   responsive to determining the page includes instructions corresponding to one of a set of function calls, (i) inserting a first transition event into the memory associated with the virtual machine at a location of a first instruction of the instructions corresponding to a function call of the set of function calls, wherein the location is on the page in the memory, and (ii) setting a permission of the page to be execute only; and
   responsive to further processing within the virtual machine causing an attempt to read from or write to the page including the first transition event, (i) halting at least a portion of the processing within the virtual machine, (ii) performing an analysis of at least one last branch record (LBR) of a virtual central processing unit (CPU) of the virtual machine, and (iii) based on the analysis of the at least one LBR, determining whether the processing displays characteristics of a return-oriented programming (ROP) attack.

18. The method of claim 17, wherein the transition event includes one of a function call, system call, or specified instructions, the execution of which results in halting of the processing within the virtual machine.

19. The method of claim 17, wherein the processing of the object within the virtual machine is managed by a virtual machine monitor.

20. The method of claim 19, wherein inserting and removing of the first transition event is performed by the virtual machine monitor.

21. The method of claim 19, wherein setting of the permission is performed by the virtual machine monitor.

22. The method of claim 17 further comprising:
receiving the object within network traffic;
performing a static analysis on the object; and
responsive to determining the object is at least suspicious, providing the object to the virtual machine for processing.

23. The method of claim 17, wherein a permission of each page in memory associated with the virtual machine is set to prohibit execution when the processing of the object begins.

24. The method of claim 17, wherein the setting of the permission of the page to be execute only prevents malware from detecting the malware detection analysis is being conducted.

25. A method for hiding transition events during malware detection comprising:
processing an object within a virtual machine managed by a virtual machine monitor;
managing, by the virtual machine monitor, insertion of a transition event at a location of an instruction located on a page in memory utilized by the virtual machine;
managing, by the virtual machine monitor, permissions of the page in memory according to the insertion of a breakpoint or a removal of the breakpoint in the instruction;
responsive to further processing within the virtual machine causing an attempt to read from or write to the page including the transition event, (i) halting at least a portion of the processing within the virtual machine, (ii) responsive to further processing within the virtual machine causing an attempt to read from or write to the page including the first transition event, (i) halting at least a portion of the processing within the virtual machine, (ii) performing an analysis of at least one last branch record (LBR) of a virtual central processing unit (CPU) of the virtual machine, and (iii) based on the analysis of the at least one LBR, determining whether the processing displays characteristics of a return-oriented programming (ROP) attack.

* * * * *